United States Patent
Parsch

(10) Patent No.: US 8,657,590 B2
(45) Date of Patent: Feb. 25, 2014

(54) HYDRAULIC POWER STEERING SYSTEM WITH CHARGING VALVE AND AIR CUSHION IN THE TANK

(75) Inventor: Willi Parsch, Seeheim (DE)

(73) Assignee: ixetic Bad Homburg GmbH, Bad Homburg v.d.H. (DE)

( * ) Notice: Subject to any disclaimer, the term of this patent is extended or adjusted under 35 U.S.C. 154(b) by 1577 days.

(21) Appl. No.: 11/919,088

(22) PCT Filed: Mar. 31, 2006

(86) PCT No.: PCT/DE2006/000585
§ 371 (c)(1),
(2), (4) Date: Oct. 23, 2007

(87) PCT Pub. No.: WO2006/114074
PCT Pub. Date: Nov. 2, 2006

(65) Prior Publication Data
US 2009/0095563 A1 Apr. 16, 2009

(30) Foreign Application Priority Data

Apr. 23, 2005 (DE) .................. 10 2005 019 059

(51) Int. Cl.
*F04B 49/00* (2006.01)
*F16K 24/00* (2006.01)
*F16K 17/26* (2006.01)

(52) U.S. Cl.
USPC ............... 417/309; 137/493.6; 137/493.8; 137/493

(58) Field of Classification Search
USPC ......... 417/299, 306; 137/493.3, 493.6, 493.9, 137/590; 220/203.01, 203.21, 203.24, 220/203.26; 251/144
See application file for complete search history.

(56) References Cited

U.S. PATENT DOCUMENTS

| | | | | |
|---|---|---|---|---|
| 1,560,272 A | * | 11/1925 | Mcausland | 137/512.3 |
| 2,273,737 A | * | 2/1942 | Snyder | 137/39 |
| 3,724,708 A | * | 4/1973 | Burgess | 220/202 |
| 3,738,384 A | * | 6/1973 | Hall | 137/493.9 |
| 3,861,414 A | * | 1/1975 | Peterson, II | 137/512.3 |
| 3,896,845 A | * | 7/1975 | Parker | 137/493.3 |
| 3,911,988 A | * | 10/1975 | Richards | 152/427 |
| 3,949,456 A | * | 4/1976 | Oberthur | 29/890.126 |
| 4,133,346 A | * | 1/1979 | Smith et al. | 137/493.6 |
| 4,280,529 A | * | 7/1981 | Silvestri | 137/493.3 |
| 4,371,317 A | * | 2/1983 | Heibel | 417/298 |
| 4,392,583 A | * | 7/1983 | Wong | 220/203.18 |
| 4,593,711 A | * | 6/1986 | Morris | 137/39 |

(Continued)

FOREIGN PATENT DOCUMENTS

| | | |
|---|---|---|
| EP | 0 253 917 A1 | 1/1988 |
| GB | 1 322 878 | 7/1973 |

(Continued)

*Primary Examiner* — Charles Freay
*Assistant Examiner* — Alexander Comley
(74) *Attorney, Agent, or Firm* — Davidson, Davidson & Kappel, LLC

(57) ABSTRACT

A hydraulic power steering system which includes a tank and a power steering pump which takes in a pressure medium from an intake area which is decoupled from the prevailing atmospheric pressure on the side of the tank wall and delivers it under pressure to the power steering system. A valve device builds up a pre-pressure in the intake area and prevents a negative pressure and a positive pressure from building up on the interior of the oil tank.

20 Claims, 1 Drawing Sheet

(56) References Cited

U.S. PATENT DOCUMENTS

| | | | |
|---|---|---|---|
| 4,736,863 A * | 4/1988 | Harris | 220/203.21 |
| 4,953,583 A * | 9/1990 | Szlaga | 137/118.02 |
| 5,020,685 A * | 6/1991 | Sato et al. | 220/203.21 |
| 5,048,628 A * | 9/1991 | Rayner | 180/421 |
| 5,165,445 A * | 11/1992 | Vertanen | 137/493.6 |
| 5,240,027 A * | 8/1993 | Vertanen | 137/73 |
| 5,311,901 A * | 5/1994 | Ostrom | 137/493.3 |
| 5,479,978 A * | 1/1996 | Zenkich | 137/493.3 |
| 5,582,198 A * | 12/1996 | Nagino et al. | 137/43 |
| 5,743,292 A * | 4/1998 | Robinson | 137/493.9 |
| 5,803,115 A * | 9/1998 | Vertanen et al. | 137/493.9 |
| 5,860,447 A * | 1/1999 | Chu | 137/505.25 |
| 5,971,203 A * | 10/1999 | Bae | 220/746 |
| 6,164,927 A * | 12/2000 | Wehage | 417/307 |
| 6,260,726 B1 * | 7/2001 | Muth et al. | 220/203.24 |
| 6,467,392 B1 * | 10/2002 | Breuning et al. | 91/447 |
| 6,619,497 B2 * | 9/2003 | Freiler | 220/201 |
| 7,201,455 B2 * | 4/2007 | Quirant et al. | 303/9.75 |
| 2002/0170769 A1 * | 11/2002 | Sakaki et al. | 180/441 |
| 2005/0161085 A1 * | 7/2005 | Haunhorst et al. | 137/202 |

FOREIGN PATENT DOCUMENTS

| | | | |
|---|---|---|---|
| GB | 1322878 A | * | 7/1973 |
| GB | 2 069 724 A | | 8/1981 |
| GB | 2 232 648 A | | 12/1990 |
| WO | WO03/040575 | | 5/2003 |

* cited by examiner

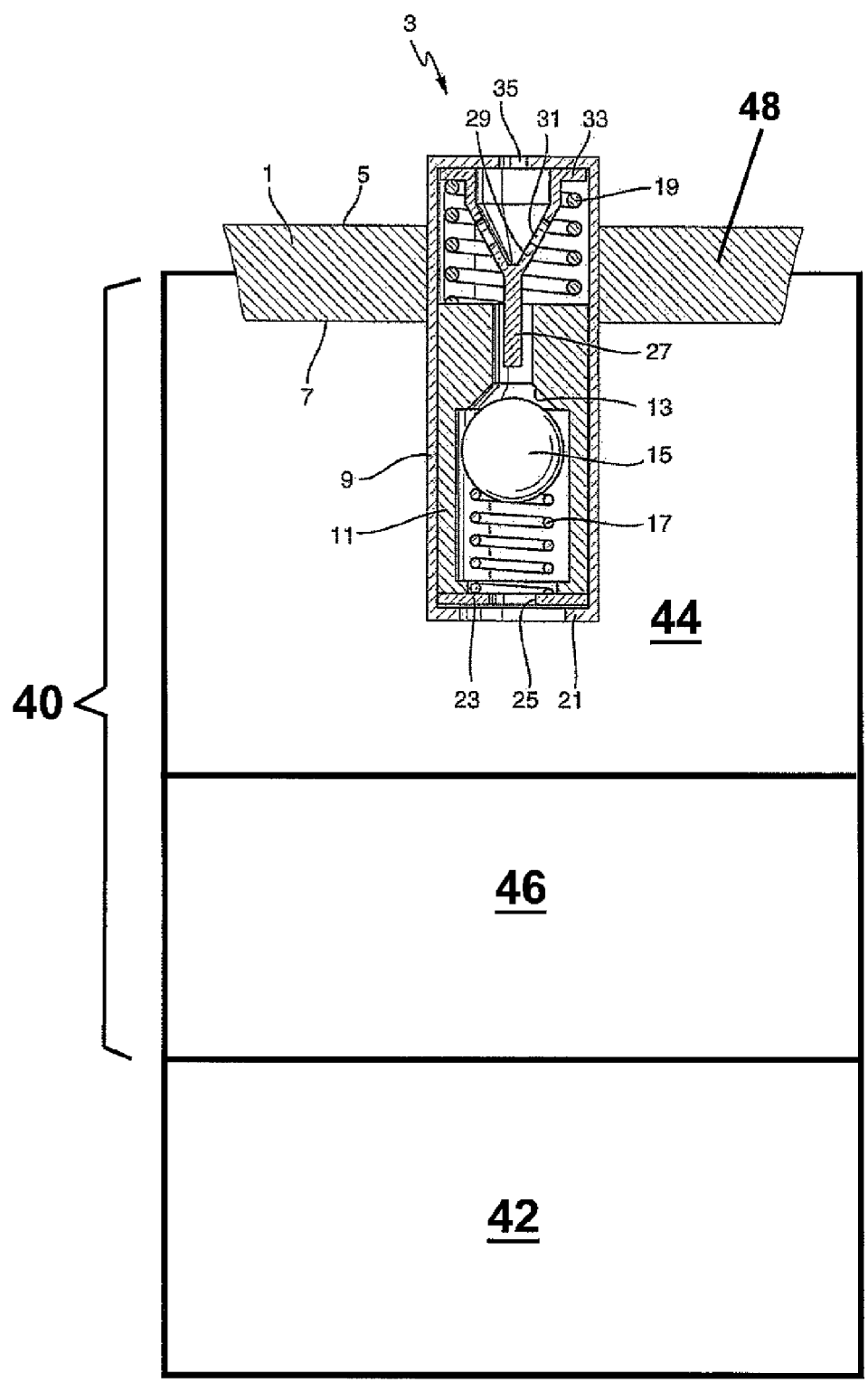

HYDRAULIC POWER STEERING SYSTEM WITH CHARGING VALVE AND AIR CUSHION IN THE TANK

The present invention relates to a hydraulic power steering system having a tank and a power steering pump which draws in a pressure medium from a suction area and delivers it under pressure into the power steering system.

BACKGROUND

Power steering systems of this kind are generally known. One problem with these systems is that cavitation occurs at the power steering pump because of insufficient suction pressure, which limits the speed and capacity of the power steering pump. Alternatively, expensive injector designs must be used with such power steering pumps in order to achieve higher suction pressures.

SUMMARY OF THE INVENTION

An object of the present invention is to provide a hydraulic power steering system which will overcome these disadvantages.

The present invention provides a hydraulic power steering system having a tank and a power steering pump which draws in a pressure medium from a suction area and delivers it under pressure into the power steering system, the suction area of the power steering system being hermetically isolated from the atmosphere and having a valve device for building up a bias pressure in the suction area. In a preferred power steering system, the valve device includes a check valve for drawing in air when there is negative pressure in the suction area, and further includes a pressure-limiting valve, or counterbalance valve, for releasing air when there is excessive pressure in the suction area.

In accordance with an embodiment of the present invention, the present invention provides that the suction pressure of the pump may be improved when the low-pressure or suction area of a steering system is isolated from the atmosphere using a hermetic tank or a hermetically sealed suction area in conjunction with an auxiliary device which controls the pressure level required in the suction area. In steering systems commonly used today, the level of the pressure medium in the reservoir or tank constantly changes due to temperature changes during operation. An air vent may ensure that there is always a balancing pressure with respect to the environment, irrespective of the level in the reservoir. If the air vent is replaced with a self-priming pressure-limiting valve, the oil level changes, in conjunction with this valve, which can be used to selectively control the pressure inside the reservoir, and thus, the suction pressure of the pump. In this process, the liquid column in the tank functions as a piston pump.

In an embodiment of a power steering system according to the present invention, the opening pressure of the check valve may be smaller, possibly significantly smaller, than the opening pressure of the pressure-limiting valve. This may have the advantage that at low temperatures, a slight decrease in pressure in the reservoir may be sufficient to cause the check valve to open, and to cause air to be drawn from the environment into the reservoir until the pressure is nearly equalized to atmospheric pressure. Therefore, the pressure difference across the check valve should be as small as possible. When the temperatures increase during operation, a positive pressure may be generated in the system due to the rise of the oil level in the tank and because of this additional volume of air. When the pressure exceeds a defined value, air can be readily released through the pressure-limiting valve. Thus, the pressure in the suction area can be automatically adjusted without additional aids, and the maximum suction pressure of the power steering pump is determined by the opening pressure of this pressure-limiting valve. Since these effects occur automatically as the system warms up after start up, it may not be absolutely necessary to pre-adjust the system when opening the reservoir or during initial filling.

A power steering system is preferred in which the two functional valve units may be arranged in a common valve housing to form a single valve device or valve assembly. This has the advantage that the two functional valve units, for example, the valve assembly needed for the above-described functions, can be disposed as a single unit in the suction area, where this unit can, for example, replace a filler cap of a tank or reservoir. Thus, existing systems can be readily converted to pressure bias in the suction area. It may be also possible to retrofit existing reservoirs.

An embodiment of a power steering system according to the present invention provides the valve seat sleeve of the check valve and the closure member of the check valve, especially a ball, together may also form a pressure-limiting valve piston. Also preferred may be a power steering system in which the pressure-limiting function may be accomplished by the joint movement of the valve seat sleeve and the pressure-limiting valve closure member against an opening pin which pushes the closure member or ball away from the seat, thus opening the check valve. Thus, the check valve may be opened once against its closing spring by negative pressure in the suction area, and a second time by a pin when there is excessive pressure in the suction area. Consequently, the check valve may have two modes of operation.

A preferred power steering system design of the present invention provides the opening pin which may be mounted on a sleeve having passage openings. This has the advantage that the opening pin may be reliably guided by the sleeve, while nevertheless allowing passage of air from the atmosphere into the tank through the passage openings within the valve housing.

Another preferred design of the present invention provides a power steering system in which the closure member, or ball, of the check valve may be pressed against the seat by a first, weak spring. The weak spring may ensure that the check valve already opens when the pressure in the suction area falls slightly below atmospheric pressure, and that it thereby may ensure the equalization of pressure and the increase in air volume in the reservoir.

A further preferred design of the present invention provides a power steering system in which the valve seat sleeve may be pressed by a second, stronger spring against a stop in the valve housing, for example, away from the opening pin. This has the advantage that, due to the stronger spring in conjunction with the piston area that provides the pressure-limiting function, a correspondingly high bias pressure or charge pressure can be adjusted for the suction area of the power steering pump.

Another preferred design of the present invention provides a power steering system in which the valve housing contains a valve seat sleeve, a ball check valve, a first spring, a second, stronger spring, an opening pin with a sleeve having passage openings, and an opening to the atmosphere. This has the advantage that this one valve assembly structurally combines two valve functions, namely that of a check valve and that of a pressure-limiting valve, which allows it to be used in any desired location in the suction area of the power steering system, or to replace any venting devices located there, so as to convert the suction area at atmospheric pressure to a suction area that is at a bias pressure.

Another preferred design of the present invention provides a power steering system in which the valve housing may be disposed in or on the tank or on the tank cap.

In accordance with certain embodiments of the present invention, a power steering system is provided having the oil column in the tank acting as a piston for biasing and drawing in the air in the suction area or tank. The level in the tank constantly changes due to temperature changes of the oil and of the power steering system during operation. This change in level can be used for drawing in air and compressing the residual air in the oil tank, using the oil column in the tank as a piston.

Another preferred design provides a power steering system in which the suction pressure of the power steering pump may be increased by the bias of the air in the tank or suction area. Advantageously, this may allow avoidance of cavitation at high speeds and high delivery rates, which may eliminate the need for expensive injector designs.

Another preferred design provides a power steering system in which the valve device can be integrated into an existing filler cap of the tank or suction area; for example, in which the valve device can replace the existing venting device.

BRIEF DESCRIPTION OF THE DRAWINGS

The present invention will now be described, with reference to the FIGURE.

The FIGURE shows a cross-sectional view of a valve device according to the present invention.

DETAILED DESCRIPTION

A valve device 3 according to the present invention is disposed in a wall 1 of an oil reservoir or tank 40 for a pump 42, the wall possibly forming part of a reservoir cap 48. Side 5 of the reservoir wall is at atmospheric pressure, while side 7 of reservoir wall 1 faces a suction area 44 of the power steering system, and therefore constitutes the inner side of the oil reservoir 40. The oil reservoir 40 itself and the suction area 44 of the power steering system are hermetically sealed off from the ambient pressure. Valve device 3 has a valve housing 9. A valve seat sleeve 11 is slidably supported in valve housing 9. Valve seat sleeve 11 includes a conical valve seat 13, which serves as a valve seat for a closure member 15 in the form of a ball. Ball 15 and valve seat 13 are shown in an open position to better illustrate the component parts. However, in reality, ball 15 would be pressed against valve seat 13 by a first, relatively weak spring 17. A second, significantly stronger spring 19 presses valve seat sleeve 11 against a stop 21 of valve housing 9. Spring 17 rests against a support disk 23, which has an opening 25 to the interior of the tank 40. An opening pin 27 is mounted on a support sleeve 29 in the upper portion of valve housing 9, said support sleeve having passage openings 31 and resting, with a collar 33, against second spring 19 within valve housing 9. Valve housing 9 further has an opening 35 to the atmosphere.

The following is a description of the operation of the valve device of the present invention. If, due to low oil temperatures or low oil levels in the reservoir 40, the pressure within the reservoir, for example, in area 7, drops below a preset level, which can be adjusted by the closing pressure of the check valve, which is determined by ball 15 and spring 17, check valve 15 opens, as illustrated in the figure, and air is drawn into the reservoir 40 from the environment, for example, from area 5, through opening 35 and openings 31, past opening pin 27 and check valve piston 15, and through opening 25 until the pressure is nearly equalized to atmospheric pressure. The pressure will be slightly below atmospheric, which is due to the pressure difference determined by spring 17 and piston area 15 of the check valve.

When the temperature of the pressure medium increases during operation, a positive pressure is generated within the hydraulic system in the suction area 44 due to the rise of the pressure medium level and the resulting compression of this additional volume of air in addition to the already existing volume of air, and by the heating and expansion of the air. When the pressure exceeds a maximum pressure against second spring 19, which is now determined by the sum of the piston area of check valve 15 and the piston area of valve seat sleeve 11, then valve seat sleeve 11 is moved upward until ball 15 moves against opening pin 27, as a result of which ball 15 is pushed away from its seat 13. Thus, no further increase in pressure can occur in the suction area 44; the pressure remains at the level determined by spring 19 and the two interacting effective pressure areas of the so-called pressure-limiting valve. Thus, the maximum pressure in the suction area 44, for example, the bias pressure, can be automatically adjusted without additional aids.

An oil column 46 in the tank 44 may act as a piston for biasing and drawing in the air in the suction area 44 or tank 40. The level in the tank 40 constantly changes due to temperature changes of the oil and of the power steering system during operation. This change in level can be used for drawing in air and compressing the residual air in the oil tank 40, using the oil column 46 in the tank 40 as a piston.

If valve device 3 is integrated directly into the filler cap of an oil reservoir, existing systems can be readily converted into biased systems. It is possible to retrofit existing reservoirs. Possibly, the steering gear and the power steering pump may have to be rated for higher suction pressures or idle pressures. In any case, it is an advantage of the present invention that the biased suction pressure enables cavitation-free operation of power steering pumps at significantly higher speeds and delivery rates.

List of Reference Numerals
1 wall of an oil reservoir
3 valve device
5 reservoir wall side at atmospheric pressure
7 reservoir wall side in the suction area
9 valve housing
11 valve seat sleeve
13 conical valve seat
15 closure member (ball)
17 first, weak spring
19 second, stronger spring
21 stop of valve housing 9
23 support disk
25 opening to the interior of the tank
27 opening pin
29 support sleeve
31 passage openings of support sleeve 29
33 collar of support sleeve 29
35 opening of valve housing 9 to the atmosphere

What is claimed is:

1. A hydraulic power steering system comprising:
a tank;
a suction area; and
a power steering pump drawing in a pressure medium from the suction area and delivering it under pressure into the power steering system;
wherein the suction area of the power steering system is hermetically isolated from the atmosphere and has a valve device for building up a bias pressure in the suction area, the valve device including a closure member and a valve seat, the closure member moving away from the valve seat when there is a negative pressure in the suction area and the valve seat moving away from the closure member when there is an excessive pressure in the suction area.

2. The power steering system as recited in claim 1 wherein the valve device includes a check valve for drawing in air when there is a negative pressure in the suction area, and a pressure-limiting valve or counterbalance valve for releasing air when there is excessive pressure in the suction area.

3. The power steering system as recited in claim 2 wherein the check valve and the pressure limiting valve each have an opening pressure, the opening pressure of the check valve being smaller than the opening pressure of the pressure limiting valve.

4. The power steering system as recited in claim 2, wherein the check valve and the pressure limiting valve are arranged in a common valve housing forming a single valve device.

5. The power steering system as recited in claim 2 wherein the check valve includes a valve seat sleeve including the valve seat and the check valve includes the closure member, the valve seat sleeve and the closure member together forming a pressure-limiting valve piston.

6. The power steering system as recited in claim 5 wherein the closure member is a ball.

7. A hydraulic power steering system comprising:
a tank;
a suction area; and
a power steering pump drawing in a pressure medium from the suction area and delivering it under pressure into the power steering system;
wherein the suction area of the power steering system is hermetically isolated from the atmosphere and has a valve device for building up a bias pressure in the suction area;
wherein the valve device includes a check valve for drawing in air when there is a negative pressure in the suction area, and a pressure-limiting valve or counterbalance valve for releasing air when there is excessive pressure in the suction area;
wherein the check valve includes a valve seat sleeve and a closure member, the valve seat sleeve and the closure member together forming a pressure-limiting valve piston;
wherein the valve seat sleeve and the closure member of the pressure limiting valve piston limit pressure by jointly moving against an opening pin, the opening pin pushing the closure member away from the valve seat sleeve, thus opening the check valve.

8. The power steering system as recited in claim 7, wherein the opening pin is mounted on a support sleeve, the support sleeve having passage openings.

9. The power steering system as recited in claim 5 wherein the closure member of the check valve is pressed against the valve seat sleeve by a first spring.

10. The power steering system as recited in claim 5 wherein the valve seat sleeve is pressed by a second spring against a stop in the valve housing, the second spring being stronger than the first spring.

11. The power steering system as recited in claim 10 wherein the valve device includes an opening pin and the valve seat sleeve is pressed away from the opening pin.

12. The power steering system as recited in claim 4 wherein the valve housing includes a valve seat sleeve, a check valve, a first spring, a second spring, an opening pin with a support sleeve having passage openings and an opening to the atmosphere, the second spring being stronger than the first spring.

13. The power steering system as recited in claim 4 wherein the valve housing is disposed in or on the tank.

14. The power steering system as recited in claim 4 further comprising a tank cap wherein the valve housing is disposed on the tank cap.

15. A hydraulic power steering system comprising: a tank; a suction area; and a power steering pump drawing in a pressure medium from the suction area and delivering it under pressure into the power steering system; wherein the suction area of the power steering system is hermetically isolated from the atmosphere and has a valve device for building up a bias pressure in the suction area; wherein the tank includes an oil column, the oil column acting as a piston for biasing or drawing in air in the suction area; wherein the valve device includes a closure member, a valve seat and an opening pin, the opening pin causing the valve seat to move away from the closure member when there is an excessive pressure in the suction area.

16. The power steering system as recited in claim 1 wherein the power steering pump has a suction pressure, the suction pressure being increased by the bias of the air in the tank or suction area.

17. The power steering system as recited in claim 4 wherein the single valve device is integrated into a cap of the tank or the suction area.

18. The power steering system as recited in claim 1 wherein the valve device further includes an opening pin, the opening pin causing the valve seat to move away from the closure member when there is an excessive pressure in the suction area.

19. The power steering system as recited in claim 18 wherein the valve device further includes a support sleeve, the opening pin being mounted on the support sleeve, the support sleeve having passage openings.

20. The power steering system as recited in claim 18 wherein the valve device further includes two springs and the valve seat is included on a valve seat sleeve, the valve seat sleeve compressing one of the springs so the opening pin contacts the closure member when there is excessive pressure in the suction area.

* * * * *